(12) United States Patent
Sadowsky

(10) Patent No.: US 7,609,780 B2
(45) Date of Patent: Oct. 27, 2009

(54) METHOD AND APPARATUS FOR PERFORMING SEQUENTIAL CLOSED LOOP MULTIPLE INPUT MULTIPLE OUTPUT (MIMO)

(75) Inventor: John S. Sadowsky, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 942 days.

(21) Appl. No.: 10/954,582

(22) Filed: Sep. 30, 2004

(65) Prior Publication Data
US 2006/0071807 A1    Apr. 6, 2006

(51) Int. Cl.
*H04K 1/02* (2006.01)
(52) U.S. Cl. .................. 375/297; 375/299; 375/267; 455/101
(58) Field of Classification Search ............. 375/267, 375/299, 297; 455/101
See application file for complete search history.

(56) References Cited

U.S. PATENT DOCUMENTS

| | | | | |
|---|---|---|---|---|
| 5,909,460 | A * | 6/1999 | Dent | 375/130 |
| 6,011,519 | A * | 1/2000 | Sadler et al. | 343/742 |
| 6,847,805 | B2 * | 1/2005 | Liu | 455/69 |
| 6,927,728 | B2 * | 8/2005 | Vook et al. | 342/377 |
| 7,257,167 | B2 * | 8/2007 | Lau | 375/295 |
| 7,336,727 | B2 * | 2/2008 | Mukkavilli et al. | 375/299 |
| 2002/0009156 | A1 | 1/2002 | Hottinen et al. | |
| 2003/0125040 | A1 * | 7/2003 | Walton et al. | 455/454 |
| 2003/0139139 | A1 * | 7/2003 | Onggosanusi et al. | 455/63 |
| 2003/0161282 | A1 * | 8/2003 | Medvedev et al. | 370/329 |
| 2003/0185309 | A1 | 10/2003 | Pautler et al. | |
| 2003/0210750 | A1 | 11/2003 | Onggosanusi et al. | |
| 2004/0002364 | A1 * | 1/2004 | Trikkonen et al. | 455/562.1 |
| 2004/0014503 | A1 | 1/2004 | Lobinger et al. | |
| 2004/0192218 | A1 * | 9/2004 | Oprea | 455/73 |
| 2004/0258025 | A1 * | 12/2004 | Li et al. | 370/334 |
| 2005/0129137 | A1 * | 6/2005 | Yamada et al. | 375/267 |
| 2005/0157808 | A1 * | 7/2005 | Ihm et al. | 375/267 |
| 2008/0108310 | A1 * | 5/2008 | Tong et al. | 455/69 |

FOREIGN PATENT DOCUMENTS

| | | |
|---|---|---|
| EP | 1079543 A1 | 2/2001 |
| WO | WO-2006039058 A1 | 4/2006 |

OTHER PUBLICATIONS

Love, "Grassmannian beamforming for multiple-input multiple-output wireless systems," IEEE Trans. Information Theory, vol. 49, No. 10, pp. 2735-2747, Oct. 2003.*

(Continued)

*Primary Examiner*—Juan A Torres
(74) *Attorney, Agent, or Firm*—The Law Offices of John C. Scott, LLC; John C. Scott

(57) ABSTRACT

In a communication system using closed loop multiple input/multiple output MIMO, beam forming information may be fed back from a receiver to a transmitter sequentially over a number of frames. The beam forming matrices that are fed back may be quantized.

19 Claims, 4 Drawing Sheets

OTHER PUBLICATIONS

Love, "Limited Feedback Precoding for Spatial Multiplexing Systems", Proc. of IEEE Globecom, San Francisco, CA, Dec. 1-5, 2003.*

IEEE P802.11 Wireless LANs. Tentative Minutes of the IEEE P802.11 Full Working Group Sep. 13-17, 2004 Estrel Hotel, Berlin, Germany. this paper can be found at http://grouper.ieee.org/groups/802/11/Minutes/Cons$_{13}$ Minutes_Sept-2004.pdf.*

Derryberry, "Transmit diversity in 3G CDMA systems", IEEE Communications Magazine, vol. 40, Issue, 4, Apr. 2002 pp. 68-75.*

Mukkavilli, "Generalized beamforming for MIMO systems with limited transmitter information", Conference Record of the Thirty-Seventh Asilomar Conference on Signals, Systems and Computers, 2003 vol. 1, Nov. 9-12, 2003 pp. 1052-1056 vol. 1.*

Mukkavilli, "Performance limits on beamforming with finite rate feedback for multiple antenna systems", Conference Record of the Thirty-Sixth Asilomar Conference on Signals, Systems and Computers, 2002 vol. 1, Nov.3-6, 2002 pp. 536-540 vol. 1.*

Jihoon, C. , et al., "Interpolation based transmit beamforming for MIMO-OFDM with Limited Feedback", *IEEE Communications Society.*, (Jun. 20, 2004),249-253.

June, C. R., et al., "An Efficient Feedback Method for MIMO Systems with slowly time-varying Channels", *Wireless Communications and Networking Conference*, vol. 02, (Mar. 21, 2004),760-764.

June, C. R., "Channel Feedback Quantization Method for MISO and MIMO Systems", *Personal Indoor and Mobile Radio Communications, IEEE International Symposium*, vol. 2, (Sep. 5, 2004),805-809.

Raghothaman, B. , et al., "Deterministic Perturbation Gradient Approximation for Transmission Subspace Tracking in FDD-CDMA", *IEEE International Conference on Communications, Anchorage, IEEE International Conference on Communications*, vol. 1 (5), (May 11, 2003),2450-2454.

* cited by examiner

METHOD AND APPARATUS FOR PERFORMING SEQUENTIAL CLOSED LOOP MULTIPLE INPUT MULTIPLE OUTPUT (MIMO)

TECHNICAL FIELD

The invention relates generally to wireless communication and, more particularly, to channel training techniques and structures for use in wireless systems.

BACKGROUND OF THE INVENTION

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link. MIMO may be performed as either an open loop or a closed loop technique. In open loop MIMO, a transmitter has no specific knowledge of the condition of the channel before signals are transmitted to a receiver. In closed loop MIMO, on the other hand, channel-related information is fed back from the receiver to the transmitter to allow the transmitter to precondition transmit signals before they are transmitted to better match the present channel state. The amount of feedback information that is delivered from a receiver to a transmitter in a system using closed loop MIMO can be very large. This may be particularly true in closed loop MIMO systems that utilize singular value decomposition (SVD) techniques in the receiver. There is a general need for strategies to reduce the overall amount of feedback used in a closed loop MIMO system.

DETAILED DESCRIPTION

Figure 1:
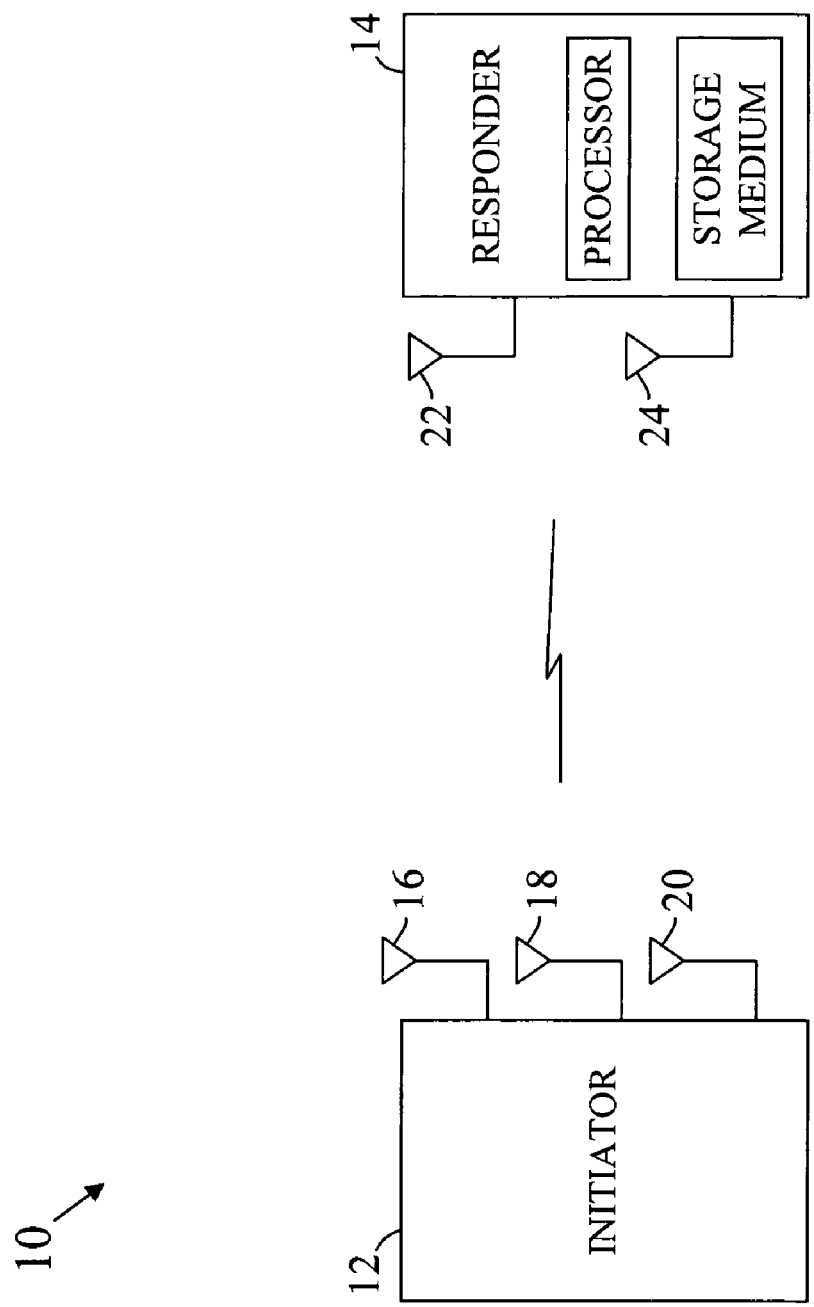
FIG. 1 is a block diagram illustrating an example wireless communication link in a MIMO-based wireless system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless communication link 10 in a MIMO-based wireless system in accordance with an embodiment of the present invention. As illustrated, a wireless initiator device 12 is communicating with a wireless responder device 14 via a wireless channel. The initiator device 12 has three transmit antennas 16, 18, 20 and the responder device 14 has two receive antennas 22, 24. The wireless channel is a multiple input, multiple output (MIMO) channel. Although illustrated with three transmit antennas 16, 18, 20 and two receive antennas 22, 24 in FIG. 1, it should be appreciated that any number (i.e., greater than 1) of transmit antennas and receive antennas may be used to form a MIMO channel. During a wireless frame exchange sequence, the wireless initiator device 12 may transmit user data to the responder device 14. After receiving a data frame from the initiator 12, the responder 14 may transmit an acknowledgement (ACK) frame (and/or other information) back to the initiator 12 to acknowledge that the data frame was successfully received. The same antennas may or may not be used for the reverse direction link that were used for the forward direction link.

The wireless link 10 of FIG. 1 may utilize closed loop MIMO techniques. That is, the responder 14 may transmit channel-related feedback information to the initiator 12 for use by the initiator 12 in developing subsequent transmit signals. By utilizing knowledge of the channel, the initiator 12 can tailor the transmit signal to the channel in a manner that simplifies receiver processing and/or improves receiver performance in the responder 14. The responder 14 can generate channel-related feedback information by appropriately processing training signals received from the initiator 12. Various methods of developing such channel-related information are known in the art. One method of developing channel-related feedback information makes use of a mathematical technique known as singular value decomposition (SVD). When SVD is utilized in a MIMO-based system, the overall technique may be referred to as SVD-MIMO. To facilitate understanding and simplify notation, the discussion that follows will be with respect to a single subcarrier in a multi-carrier system (e.g., an OFDM system). It should be appreciated, however, that the below described functions will typically need to be performed for each of the subcarriers within a multi-carrier system.

In a MIMO-based system, a wireless channel may be characterized using an $n_{RX} \times n_{TX}$ channel matrix H, where $n_{RX}$ is the number of receive antennas and $n_{TX}$ is the number of transmit antennas. Using SVD, the channel matrix H may be assumed to be in the form:

$$H = U \Sigma V^H$$

where U and V are unitary matrices (i.e., matrices with orthonormal columns and unit amplitude), $\Sigma$ is a diagonal matrix, and $V^H$ is the Hermitian of matrix V. A unitary matrix U has the following property:

$$U^H U = I$$

where I is the identity matrix. If the channel matrix H is in the above form, and if the matrix V can be determined, then the vector X of complex symbols to be transmitted by the transmitter into the MIMO channel may be multiplied by V before transmission. The transmitter will thus transmit symbols Z=VX, where V may be referred to as the beam forming matrix. The transmitted symbols Z are then acted upon by the channel H and are also subject to noise in the channel. Thus, the signal Y received by the receiver (at the other side of the MIMO channel) may be represented as:

$$Y = HVX + N$$

where N is the additive noise. From the channel expression given above, it is found that:

$$HV = U\Sigma V^H V = U\Sigma I = U\Sigma$$

Therefore, Y may be expressed as:

$$Y = U\Sigma X + N$$

In the receiver, the received signal Y can simply be matrix multiplied by $U^H$ and the following result may be achieved:

$$YU^H = UU^H \Sigma X + U^H N = I\Sigma X + U^H N = \Sigma X + U^H N$$

Thus, if the diagonal matrix $\Sigma$ is known, the symbols X may be recovered. The above-described technique essentially diagonalizes the channel and allows the originally transmitted symbols to be recovered in the receiver. The elements of the diagonal matrix $\Sigma$ are known as the singular values (or eigenvalues) of the channel matrix H and they may be determined using well known SVD techniques.

The receiver associated with a MIMO channel will typically measure the H matrix using known training signals received from the transmitter. An SVD may then be performed to determine the V matrix. In a closed loop system, the V matrix may then be transmitted back to the transmitter. The amount of V matrix data will often be quite large. For example, in a system using orthogonal frequency division multiplexing (OFDM), the V matrix may include a 4×4 matrix for each of the subcarriers of an OFDM symbol. As will be appreciated, this is a large amount of data to be transmitted back to the transmitter and may have a significant impact on overall throughput within the system. In accordance with at least one embodiment of the present invention, a sequential method of closed loop MIMO is provided that is capable of reducing the overall amount of feedback data that is transmitted back to the transmitter when performing SVD-MIMO. Instead of transmitting the entire V matrix back to the transmitter for each frame received therefrom, the V matrix information may be transmitted back sequentially over a number of frames so that the average amount of feedback is significantly less.

Figure 2:
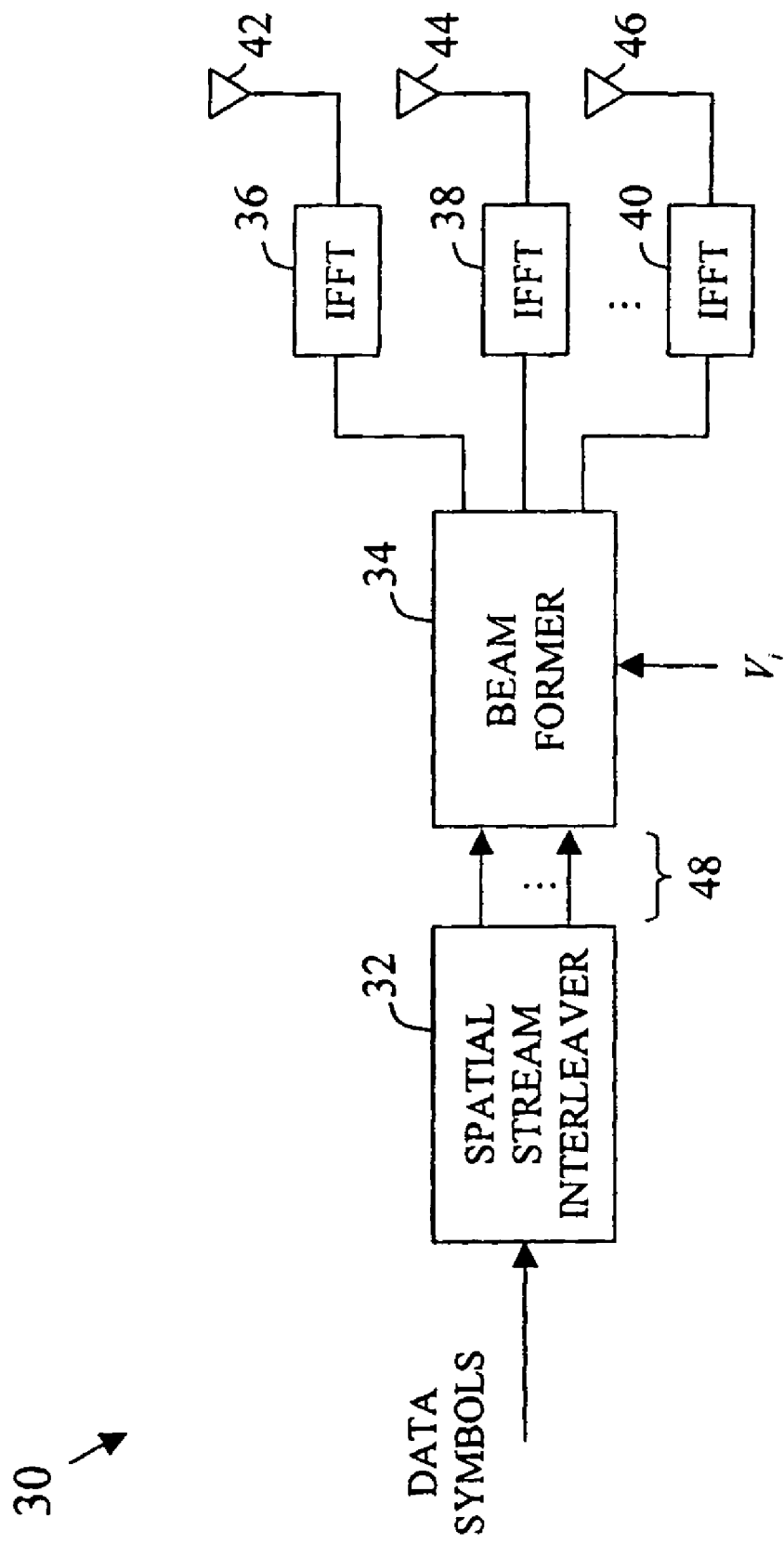
FIG. 2 is a block diagram illustrating an example transmitter arrangement that may be used in an SVD-MIMO based system in accordance with an embodiment of the present invention.

FIG. 2 is a block diagram illustrating an example transmitter arrangement 30 that may be used in an SVD-MIMO based system in accordance with an embodiment of the present invention. The transmitter arrangement 30 may be located within, for example, a wireless device that is configured to act as an initiator device within a high throughput wireless network. Other applications also exist. As shown, the transmitter arrangement 30 may include one or more of: a spatial stream interleaver 32, a beamformer 34, a number of inverse fast Fourier transform (IFFT) devices 36, 38, 40, and a number of antennas 42, 44, 46. The spatial stream interleaver 32 receives data symbols at an input thereof and separates these data symbols into a plurality of spatial streams 48. The data symbols may be received by the spatial stream interleaver 32 from, for example, a mapper unit (not shown) that maps input data into corresponding modulation symbols based on a predetermined modulation scheme (e.g., binary phase shift keying (BPSK), quadrature phase shift keying (QPSK), quadrature amplitude modulation (QAM), etc.). The beam former 34 receives the spatial streams from the spatial stream interleaver 32 and matrix multiplies a present vector of symbols by the beam forming matrix V to generate signals for delivery to the multiple transmit antennas 42, 44, 46. The number of transmit antennas may or may not be equal to the number of spatial streams input to the beam former 34.

As OFDM is being used in the illustrated embodiment, the output signals of the beamformer 34 may each be processed by an IFFT 36, 38, 40 before being transmitted by a corresponding transmit antenna 42, 44, 46. The beam forming matrix V used by the beamformer 34 is derived from feedback information received from a device on the other side of the MIMO channel (e.g., a responder device, etc.). As will be appreciated, the architecture of the transmitting arrangement 30 of FIG. 2 represents one possible transmitter architecture that may be used in accordance with the present invention. Other architectures may alternatively be used.

Figure 3:
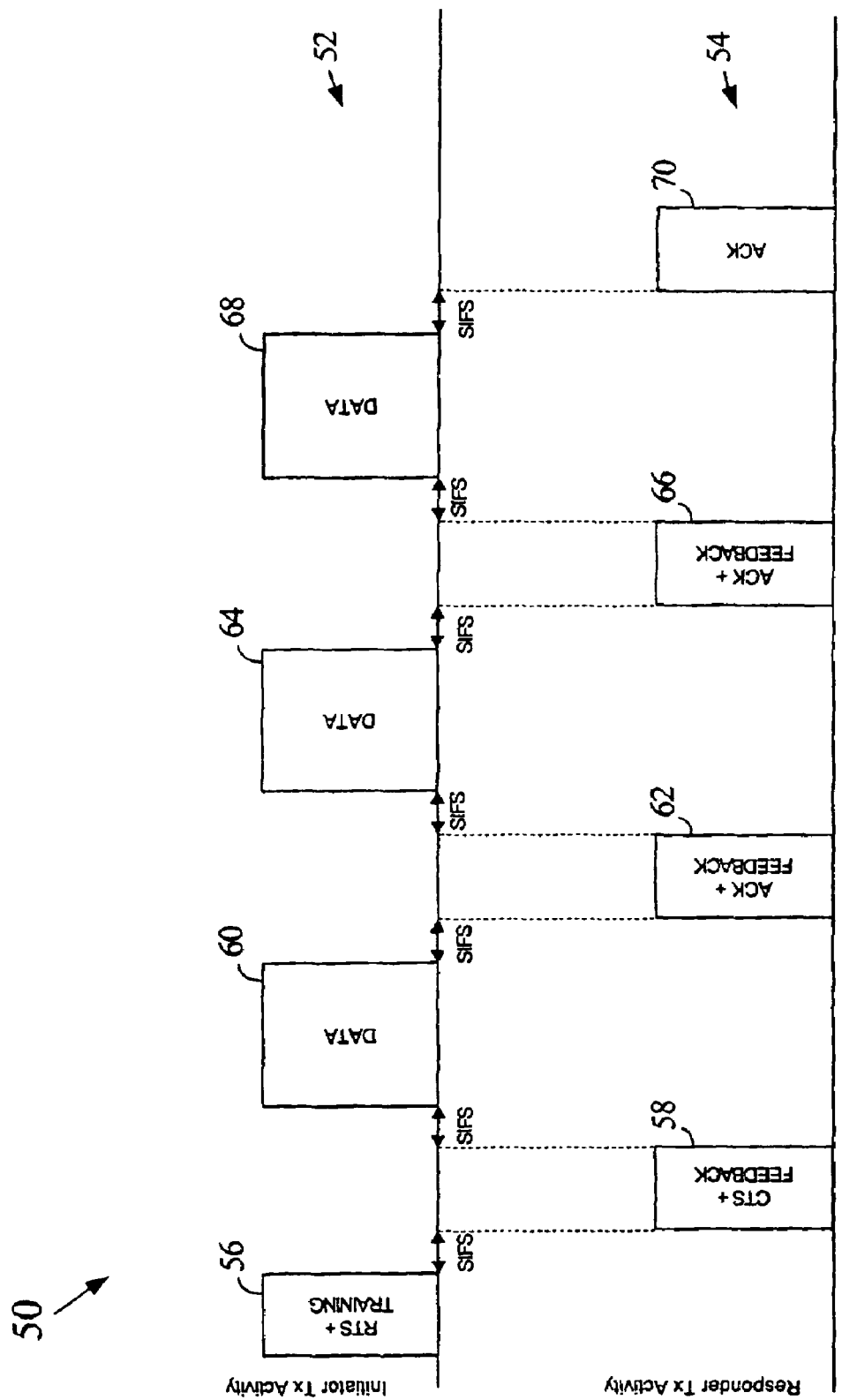
FIG. 3 is a timing diagram illustrating an example wireless frame exchange sequence between an initiator and a responder in a wireless network in accordance with an embodiment of the present invention.

FIG. 3 is a timing diagram illustrating an example wireless frame exchange 50 that may occur in a wireless network using MIMO in accordance with an embodiment of the present invention. The upper portion 52 of the diagram represents the transmit activity of an initiator device during the wireless frame exchange 50 and the lower portion 54 represents the transmit activity of a responder device. As shown, the initiator initially transmits a request to send (RTS) frame 56 to the responder. The RTS frame 56 may include information such as, for example, the address of the initiator, the address of the subject responder, and the duration of the frame exchange to follow. The RTS frame 56 may also include training signals for use in performing channel training in the responder. When the responder receives the RTS frame 56, it processes the received training signals to develop channel information that characterizes the MIMO channel. After a short period (e.g., a short inter frame space (SIFS)), the responder may transmit a clear to send (CTS) frame 58 back to the initiator indicating that it is clear to start transmitting data. The CTS frame 58 may include channel related feedback information (e.g., a beam forming matrix) for use by the initiator in transmitting data.

The CTS frame 58 may also include the same duration information that the RTS frame 56 included (or a slightly modified version). Any other devices receiving either the RTS frame 56 or the CTS frame 58 may read the duration information and set a network allocation vector (NAV) based thereon. These other devices will thereafter treat the wireless medium as reserved until the end of the identified duration and refrain from transmitting. In this manner, collisions may be avoided.

The initiator receives the CTS frame 58 and determines that it may now start to transmit data. The initiator reads the feedback information within the CTS frame 58 and uses the information to generate (after a SIFS) a data frame 60 for transmission to the responder. In addition to data, the data frame 60 may also include channel training signals. The responder may receive the data frame 60, read and record the user data therein, and use the training signals to again generate channel related information. The responder may then transmit a response frame 62 back to the initiator that includes an acknowledgement packet acknowledging the receipt of the data frame 60 and also new channel related feedback information. This process may be repeated with additional data frames (e.g., frames 64, 68, etc.) and additional response frames (e.g., frames 66, 70, etc.) until all of the relevant data has been successfully transferred to the responder. The final response frame 70 may not include feedback information.

In conceiving the present invention, it was determined that successive approximations of an optimal SVD beam forming matrix can converge to near optimal SVD-MIMO performance, while significantly reducing the feedback required for convergence and subsequent tracking of a dynamic channel. The coherence time of a channel in a wireless network is often long. For example, the coherence time in an IEEE 802.11 based network may be in the hundreds of milliseconds. A frame in such a network (e.g., a physical layer protocol data unit (PPDU)), on the other hand, may be on the order of 1 millisecond. The channel coherence time, therefore, may be at least several frame exchange sequences in length. Based on the above, it was determined that it was possible to utilize quantization methods with respect to the beamforming V matrices with little impact on link performance. By quantizing the V matrix information that is to be fed back to the initiator, the overall amount of feedback information may be reduced considerably. The feedback information may be transmitted back to the initiator over several frames, rather than all at once. As will be described in greater detail, the feedback matrix that is delivered to the initiator from the responder in response to each received data frame may be a correction matrix to the previously used V matrix, rather than the entire V matrix, in a differential encoding style approach.

With reference to FIG. 3, in at least one embodiment of the present invention, the initiator may use a predetermined matrix (e.g., an identity matrix, I) as the beam forming matrix $V_0$ during transmission of the RTS frame 56. When the responder subsequently receives the RTS frame 56, it may calculate the channel matrix $H_0$ of the MIMO channel. The responder may then perform an SVD operation on the channel matrix $H_0$ to determine a corresponding beam forming matrix $\tilde{V}_0$ to be fed back to the initiator. In effect, the matrix $\tilde{V}_0$ is a correction to the beam forming matrix $V_0$ that was used by the initiator to transmit the RTS frame 56 to the responder (which, as discussed above, may be the identity matrix). In at least one embodiment, as described above, quantization is used to describe the beamforming matrices in the network. Any quantization technique may be used including, for example, a coarse element-by-element type quantization, a vector type quantization (e.g., Grassmanian beam forming, etc.), and/or others.

The initiator receives the beam forming matrix $\tilde{V}_0$ and uses it to update the beam forming matrix $V_0$ used to transmit the RTS frame 56 for use with the subsequent data frame 60. This update may be a simple matrix multiplication (e.g., a right multiplication). The initiator may then use the new beam forming matrix $V_1$ to transmit data frame 60. The responder receives data frame 60 and determines the channel matrix of the channel. However, the channel matrix determined by the responder will be for the combined channel, including both the beam forming matrix $V_1$ and the actual channel $H_1$ (i.e., $\tilde{H}_1 = V_1 H_1$). The responder then performs an SVD operation to determine a beam forming matrix $\tilde{V}_1$ to be fed back to the initiator. The beam forming matrix $\tilde{V}_1$ is what the responder would want the initiator to precondition the channel with, assuming the combined channel is the actual channel. Quantization techniques are again used. If the beam forming matrix $V_1$ used to transmit data frame 60 had been optimal, then the SVD operation would result in a diagonal matrix and there would be no feedback data to be transmitted. However, because quantization is being used, and because of the effects of channel fading, an ideal beam forming matrix may rarely be achieved.

As before, the initiator receives the beam forming matrix $\tilde{V}_1$ and uses it to update the beam forming matrix $V_1$ used to transmit data frame 60 (e.g., $V_2 = V_1 \tilde{V}_1 = V_0 \tilde{V}_0 \tilde{V}_1$). The initiator then uses the new beam forming matrix $V_2$ to transmit data frame 64, and so on. In general, the beam forming matrix for the kth data frame may be expressed as:

$$V_k = V_{k-1} \tilde{V}_{k-1} = \prod_{\kappa=0}^{k} \tilde{V}_\kappa$$

where the identity matrix was used as the initial beam forming matrix $V_0$.

Figure 4:
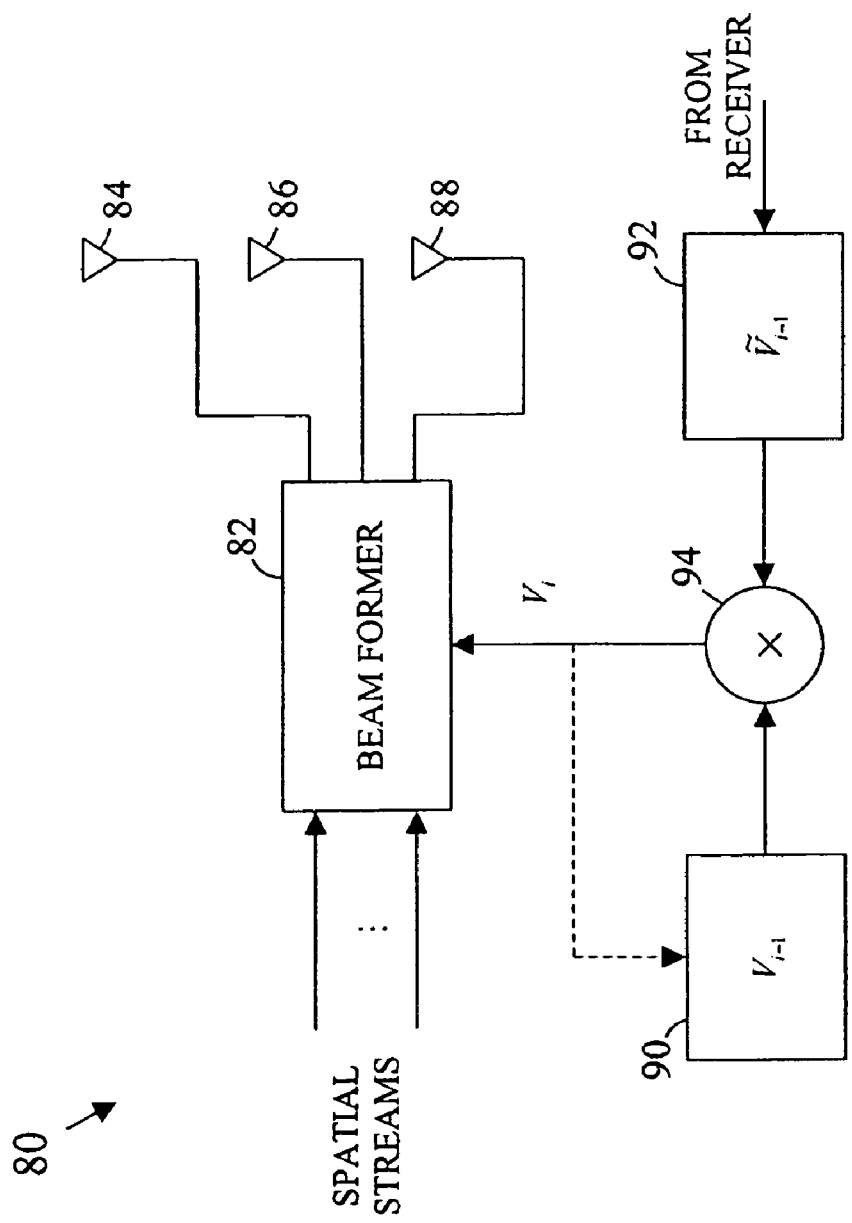
FIG. 4 is a block diagram illustrating an example transmitter arrangement in accordance with an embodiment of the present invention.

FIG. 4 is a block diagram illustrating an example transmitter arrangement 80 in accordance with an embodiment of the present invention. As illustrated, the transmitter arrangement 80 includes: a beam former 82, a plurality of transmit antennas 84, 86, 88, first and second beam forming matrix storage areas 90, 92, and a combiner 94. The beam former 82 receives data symbols at inputs thereof, via multiple spatial streams, and matrix multiplies vectors of input symbols by the beam forming matrix $V_i$. The outputs of the beam former 82 then feed the multiple transmit antennas 84, 86, 88. Although not shown, other functionality may be between the beam former 82 and each individual transmit antenna 84, 86, 88 (e.g., an IFFT, a power amplifier, etc.). The transmit antennas 84, 86, 88 may include any type of antenna element including, for example, dipoles, patches, helical antennas, and/or others. Any number of transmit antennas may be used ($n_{TX} > 1$).

The first beam forming matrix storage area 90 is operative for storing the beam forming matrix that was used to transmit the last data frame transmitted by the transmitter arrangement 80 (i.e., $V_{i-1}$). The second beam forming matrix storage area 92 is operative for storing the beam forming correction matrix most recently received from the responder (i.e., $\tilde{V}_{i-1}$). The combiner 94 is operative for combining the stored matrices to generate an updated beam forming matrix $V_i$ for use by the beam former 82. In at least one embodiment, the combiner 94 is a matrix multiplication unit. The first and second beam forming matrix storage areas 90, 92 may be associated with any type of device that is capable of storing digital data. After the updated beam forming matrix $V_i$ has been generated and delivered to the beam former 82, it may then be stored within the first beam forming matrix storage area 90 for use with a subsequent data frame. In at least one embodiment, an initialization unit may be provided to initialize the beam forming matrix that is used by the beam former 82 at the beginning of a frame exchange sequence (e.g., to the identity matrix, I). As described previously, quantization may be used for the beam forming matrices. The transmitter arrangement 80 of FIG. 4 may be used, for example, during a frame exchange sequence, such as the one illustrated in FIG. 3. Other architectures may alternatively be used.

V-matrix quantization can be achieved in a number of ways. A direct method is to simply quantize element-by-element. A more efficient approach is to apply vector-quantization techniques to the entire matrix. These methods may achieve quantization efficiency by exploiting properties of unitary matrices in general, or SVD properties more specifically. In particular, the U and V matrices are not unique. If $H = U \Sigma V^H$ and D is a diagonal unitary matrix (that is; a diagonal matrix with diagonal elements that are unit magnitude complex numbers), then, since diagonal matrices commute, it follows that $(UD)\Sigma(VD)^H = UD\Sigma D^H V^H = UDD^H \Sigma V^H = U\Sigma V^H = H$. Thus, the pair (UD, VD) provides another SVD decomposition. This invariance with respect to diagonal unitary matrices provides degrees of freedom that can be exploited in vector quantization. In addition to unitary matrix properties, one can exploit the typically strong correlation between adjacent subcarriers in an OFDM system. One quantized V-matrix may be applied to groups of adjacent OFDM subcarriers. Other quantization techniques may alternatively be used.

In at least one aspect, the present invention is based on convergence towards SVD-MIMO over several packet exchanges. The quantization may vary from packet to packet in order to facilitate rapid convergence (i.e., adaptive quantization). The first packet may utilize a fairly coarse quantization followed by finer quantization on later packets. Thus, principles of differential-encoding (quantization) can be applied as well.

In the description above, various features of the invention are described using terminology (e.g., RTS, CTS, etc.) that is associated with the IEEE 802.11 wireless networking standard. It should be appreciated, however, that the invention is not limited to use within systems following the IEEE 802.11 standard and its progeny. Also, it should be understood that the frame exchange sequence 50 of FIG. 3 is an example of one possible application of sequential closed loop MIMO in accordance with an embodiment of the invention. Many other applications also exist. For example, the feedback delivered to a transmitter unit does not have to be made part of an acknowledgement frame. Any type of feedback path may be used. Similarly, RTS and CTS frames 56, 58 are not required. The inventive techniques and structures may be used in wireless networks and in other forms of wireless communication systems.

It should be appreciated that the individual blocks illustrated in the block diagrams herein may be functional in nature and do not necessarily correspond to discrete hardware elements. For example, in at least one embodiment, two or more of the blocks in a block diagram (e.g., beam former 82 and combiner 94 in FIG. 4, etc.) may be implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless device comprising:
a beam former to multiply input data symbols by a beam forming matrix to form signals to be directed to multiple antennas for transmission into a MIMO channel as a data frame;
a first storage area to store a beam forming matrix that was used by said beam former during generation of a most recently transmitted data frame;
a second storage area to store a feedback matrix received from a remote device; and
a combiner to combine said beam forming matrix and said feedback matrix to generate an updated beam forming matrix for use by said beam former during generation of a subsequent data frame, wherein said combiner is a multiplication unit that right multiplies said beam forming matrix with said feedback matrix to generate said updated beam forming matrix.

2. The wireless device of claim 1, wherein:
said feedback matrix received from said remote device is quantized.

3. The wireless device of claim 1, wherein:
said wireless device is for use in a wireless network where data is transmitted in wireless frame exchange sequences, wherein said feedback matrix is received from said remote device as part of a response frame that also includes an acknowledgement packet.

4. The wireless device of claim 3, wherein:
said combiner generates updated beam forming matrices for multiple successive data frames transmitted during a frame exchange sequence.

5. A wireless device comprising:
at least one dipole antenna;
a beam former to multiply input data symbols by a beam forming matrix to form signals to be directed to multiple antennas for transmission into a MIMO channel as a data frame, said multiple antennas including said at least one dipole antenna;
a first storage area to store a beam forming matrix that was used by said beam former during generation of a most recently transmitted data frame;
a second storage area to store a feedback matrix received from a remote device; and
a combiner to combine said beam forming matrix and said feedback matrix to generate an updated beam forming matrix for use by said beam former during generation of a subsequent data frame, wherein said combiner is a multiplication unit that right multiplies said beam forming matrix with said feedback matrix to generate said updated beam forming matrix.

6. The wireless device of claim 5, wherein:
said combiner is a multiplication unit.

7. The wireless device of claim 5, wherein:
said feedback matrix received from said remote device is quantized.

8. An article comprising a computer readable storage medium having instructions stored thereon that, when executed by a computing platform, operate to:
receive a signal $Y_i$ from a MIMO channel, said signal $Y_i$ including data symbols $X_i$ that were matrix multiplied by a beam forming matrix $V_i$ within a remote transmitter before being transmitted into said MIMO channel, said MIMO channel having a channel matrix $H_i$;
use said signal $Y_i$ to determine a combined channel $\tilde{H}_i$ that includes effects of both the beam forming matrix $V_i$ and the channel matrix $H_i$;

perform a singular value decomposition (SVD) of the combined channel $\tilde{H}_i$ to determine a beam forming matrix $\tilde{V}_i$ representing a correction that is needed for the beam forming matrix $V_i$; and transmit said beam forming matrix $\tilde{V}_i$ to said remote transmitter to be multiplied with said beam forming matrix $V_i$ to generate a new beam forming matrix $V_{i+1}$ for use in a subsequent data transmission from said remote transmitter.

9. The article of claim 8, wherein said instructions further operate to:
quantize said beam forming matrix $\tilde{V}_i$ before it is transmitted.

10. The article of claim 8, wherein said instructions further operate to:
quantize said beam forming matrix $\tilde{V}_i$ using vector quantization techniques before said beam forming matrix $\tilde{V}_i$ is transmitted.

11. The article of claim 8, wherein said instructions further operate to:
quantize said beam forming matrix $\tilde{V}_i$ using adaptive quantization techniques before said beam forming matrix $\tilde{V}_i$ is transmitted.

12. A wireless device comprising:
a plurality of antennas; and
a digital processing device to support communication with a remote wireless device via a multiple input/multiple output (MIMO) channel, said digital processing device being programmed to:
receive a signal $Y_i$ from said MIMO channel, said signal $Y_i$ including data symbols $X_i$ that were matrix multiplied by a beam forming matrix $V_i$ within a transmitter of said remote wireless device before being transmitted into said MIMO channel, said MIMO channel having a channel matrix $H_i$;
use said signal $Y_i$ to determine a combined channel $\tilde{H}_i$ that includes effects of both the beam forming matrix $V_i$ and the channel matrix $H_i$;
perform singular value decomposition (SVD) of the combined channel $\tilde{H}_i$ to determine a beam forming matrix $\tilde{V}_i$ representing a correction that is needed for the beam forming matrix $V_i$; and
transmit said beam forming matrix $\tilde{V}_i$ to said remote wireless device to be multiplied with said beam forming matrix $V_i$ to generate a new beam forming matrix $V_{i+1}$ for use in a subsequent data transmission from said remote wireless device.

13. The wireless device of claim 12, wherein:
said communication with said remote wireless device includes a frame exchange sequence with said remote wireless device; and
receive, use, perform, and transmit are repeated for multiple successive data frames received during said frame exchange sequence.

14. The wireless device of claim 12, wherein:
said communication with said remote wireless device includes a frame exchange sequence with said remote wireless device; and
transmission of said beam forming matrix $\tilde{V}_i$ to said remote wireless device includes transmitting said beam forming matrix $\tilde{V}_i$ as part of a response frame that also includes an acknowledgement packet.

15. The wireless device of claim 12, wherein said digital processing device is programmed to:
quantize said beam forming matrix $\tilde{V}_i$ before transmitting it to said remote wireless device.

16. The wireless device of claim 12, wherein said digital processing device is programmed to:
quantize said beam forming matrix $\tilde{V}_i$ using vector quantization techniques before transmitting it to said remote wireless device.

17. The wireless device of claim 12, wherein said digital processing device is programmed to:
quantize said beam forming matrix $\tilde{V}_i$ using Grassmanian beam forming techniques before transmitting it to said remote wireless device.

18. The wireless device of claim 12, wherein said digital processing device is programmed to:
quantize said beam forming matrix $\tilde{V}_i$ using adaptive quantization techniques before transmitting it to said remote wireless device.

19. The wireless device of claim 12, wherein said digital processing device is programmed to:
quantize said beam forming matrix $\tilde{V}_i$ using differential quantization techniques before transmitting it to said remote wireless device.

* * * * *

UNITED STATES PATENT AND TRADEMARK OFFICE
CERTIFICATE OF CORRECTION

PATENT NO. : 7,609,780 B2  Page 1 of 1
APPLICATION NO. : 10/954582
DATED : October 27, 2009
INVENTOR(S) : John S. Sadowsky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1320 days.

Signed and Sealed this

Twelfth Day of October, 2010

David J. Kappos
*Director of the United States Patent and Trademark Office*